Aug. 11, 1959  H. D. KIEFABER  2,898,683
PNEUMATIC GAGE HEAD
Filed April 17, 1956
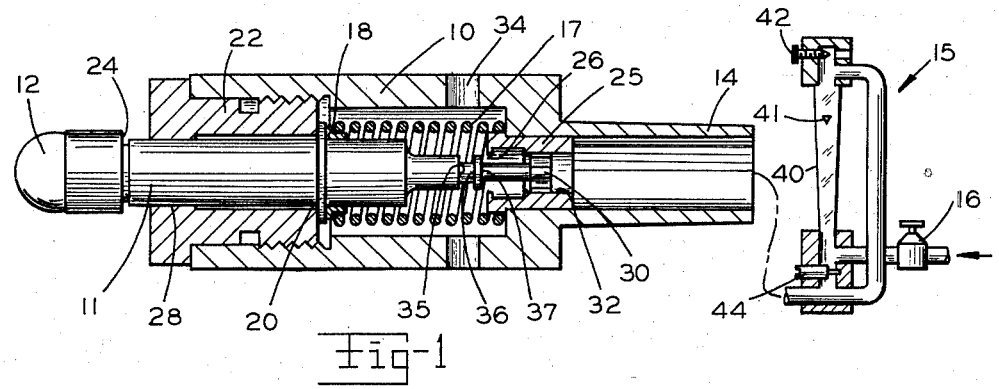
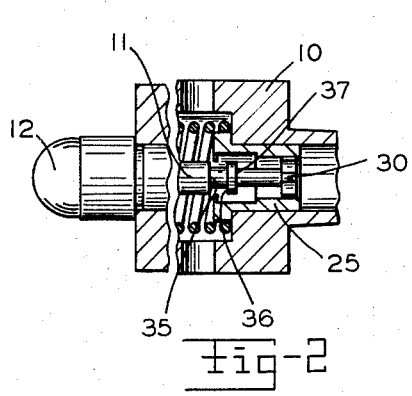
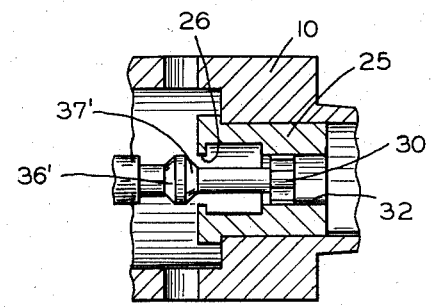
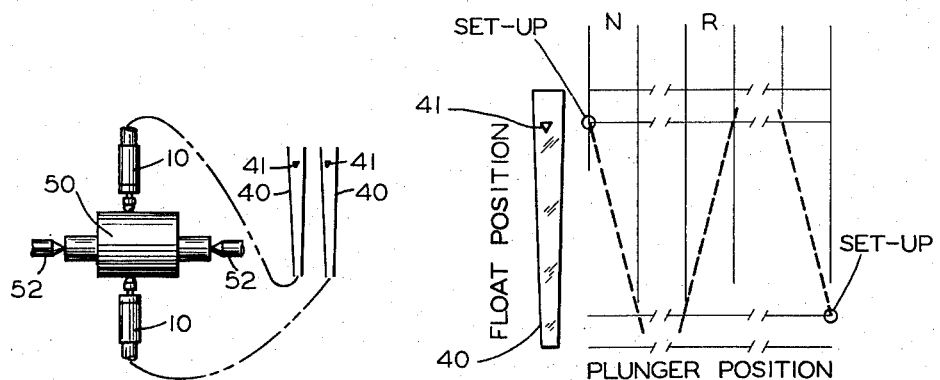
INVENTOR.
Harry D. Kiefaber
BY
Edward J. Roe Jr.

United States Patent Office 2,898,683
Patented Aug. 11, 1959

2,898,683
PNEUMATIC GAGE HEAD

Harry D. Kiefaber, Dayton, Ohio, assignor, by mesne assignments, to The Sheffield Corporation, a corporation of Delaware Application April 17, 1956, Serial No. 578,760

12 Claims. (Cl. 33—147)

This invention relates to gaging devices and more particularly to a gage head for use in gaging systems of the air leakage type for measuring part dimensions, machine movements and like conditions.

It is an object of this invention to provide a gage head for use with air leakage gaging systems which has advantages of simplicity and economy in set-up and manufacture, and includes features providing for more universal application.

It is a further object to provide an air leakage gage head controlled by a movable plunger and in which a first predetermined set-up flow condition is obtained with the plunger at its outer limit of movement and a second predetermined set-up flow condition at its inner limit of movement.

It is a further object to provide a gage head for use with gaging systems of the air leakage type wherein a movable plunger controlling the flow through leakage orifice means has spaced orifice controlling surfaces which are sequentially in flow controlling relation with the orifice means.

It is a further object to provide such a gage head wherein the flow controlling plunger has inner and outer limits of movement relative to the orifice means, one controlling surface being in control relation with the orifice means at the inner plunger position and another at the outer plunger position whereby a pair of predetermined flow conditions of different magnitudes are quickly and easily obtained for use in set-up prior to gaging and operational checks as desired.

It is a further object to provide an air leakage gage head having a flow controlling plunger and which without modification can be used during gaging to produce either increasing or decreasing flows as desired with inward plunger movement.

It is a further object to provide a gage head wherein opposed orifice controlling surfaces relatively spaced along a controlling plunger are movable within and to either side of an air leakage orifice provided for connection to a gaging system whereby flow changes of different senses can be obtained during plunger movement in a given direction relative to the orifice means.

Other objects and advantages of the invention will be apparent from the following description, the appended claims, and the accompanying drawing, in which, Figure 1 is a longitudinal central section of a gage head embodying the present invention shown connected to an exemplary indicating instrument, Figure 2 is a fragment of Figure 1 shown with the actuating plunger in another position, Figure 3 is a diagrammatic illustration of an exemplary application of the gage head, Figure 4 is a graph indicating variations in flow during plunger movement relative to the orifice means, and, Figure 5 is an enlarged fragment showing a modification in the form of the orifice controlling surfaces.

The present invention provides an improved gage head of the type wherein a movable member or plunger controls flow through orifice means provided for connection to air leakage gaging systems for measuring part dimensions, machine movements and like conditions.

In prior gage heads of this character, plunger movements in one direction controlled flow through the gage head only in one sense. For example, inward plunger movements during gaging with one head would only give a progressively decreasing flow condition. If a progressively increasing gaging flow with inward movement were required another gage head of different construction was necessary. Regardless of which type head was used, in ordinary applications two set-up masters were required for use with instrument or system adjustments to obtain accurate response at two predetermined points on the instrument scale during set-up, for example. These were necessary in the absence of any other way of accurately checking to see that the amplification of the system had not changed and that accurately reliable gaging results were being obtained.

Through the teachings of the present invention it is possible to provide in a single gage head, in a simple and economical manner, cooperating plunger and orifice portions which, without involving the use of expensive masters or the like, will provide two predetermined flow conditions for use in adjusting and correlating the system and head in set-up and for checking operation as desired. Also by selecting the portion of available plunger movement range to be utilized during gaging either decreasing or increasing flow conditions can be obtained with plunger movement in the same direction and all with the same gage head.

In the particular gage head illustrated for the purpose of disclosing the invention a work contacting plunger is carried for flow controlling movement in a gage head body adapted for connection to an air leakage gaging system. The body and plunger have flow controlling portions cooperating to obtain the desired response to plunger movements. As herein shown the plunger has spaced orifice controlling surfaces along its length which are in flow controlling relation with the orifice means during different portions of the plunger movement. For example, a pair of similar opposed orifice controlling surfaces having transverse dimensions allowing their movement through and to each side of an orifice having similar up and downstream portions will progressively decrease fluid flow during inward movement toward the orifice means, cut off flow during the transition through the orifice means, and progressively increase flow at the same rate with further movement in the same direction. By limiting the inward and outward positions of the plunger relative to the orifice means, different orifice controlling surfaces can be situated at predetermined positions relative thereto and predetermined flow conditions can be simply obtained by moving the plunger inward against a limiting stop or releasing it for movement to its full extent in an outward direction.

In applications of air leakage gaging heads of this character when decreasing flow conditions are obtained with inward plunger movements the response is described as "normal." When increasing flow conditions are obtained with inward plunger movements the control is considered as "reverse."

Referring more particularly to the drawings it will be seen that the illustrated gage head comprises a body 10 slidably supporting an actuating plunger 11 having a work contactor 12 at its outer end. Work contactor 12 can be positioned by a part dimension or movement of a machine component whose displacement is to be measured either by direct contact or through intermediate actuating members. The inner end of the gage head body 10 has an extension 14 for connection through flexible tubing and in a conventional manner to a gaging system. As shown the head is connected to an indicating instrument 15 of the air flow type receiving air under pressure from a suitable source passing through a regulator 16.

The instrument 15 is of a type wherein flow from regulator 16 passing upward through a transparent internally tapered flow tube 40 positions an indicating float 41 in accordance with the velocity of flow and leakage through the gage head. A variable amount of air can be bled directly to atmosphere at the upper end of tube 40 through adjustment of knob 42, providing a float position adjustment during set-up. Adjustment 44 controls the amount of air by-passed directly from the source to the gage head to vary the instrument amplification.

Plunger 11 is urged to the left as seen in Figure 1 and outward relative to body 10 by a spring 17 acting between a shoulder on body 10 and a washer 18 which in turn abuts a snap ring 20 seated in a groove in the plunger. The outer limited position of plunger 11 is determined by engagement of snap ring 20 with the inner end of a bushing 22 threaded into the gage head body 10. The inward limited position is determined by engagement of stop surface 24 with the outer end of bushing 22.

A sleeve 25 supported in body 10 provides leakage orifice means 26 in communication with the air source and the gaging instrument 15. The outer end of plunger 11 is slidably supported by a surface of limited axial extent 28 provided by bushing 22. Guide 30 at the inner end of plunger 10 is slidable within a passage 32 aligned with orifice 26 in sleeve 25. The internal passage of sleeve 25 is radially enlarged between orifice 26 and guide passage 32. Guide 30 provides radially reduced passages or openings allowing the flow of fluid past the guide and to the leakage orifice. Leakage through orifice 26 exhausts directly to atmosphere through openings 34 in body 10.

Plunger 11 is provided with orifice controlling portions or surfaces 35, 36, and 37 spaced along its length adjacent its inner end. The transverse dimension of the flange like portion of plunger 11 providing controlling surfaces 36 and 37 is sufficiently small to allow the movement of the surfaces through orifice 26 and to either side thereof. When surfaces 36 and 37 are relatively centered with respect to orifice 26 flow is effectively terminated.

As plunger 11 moves inward from its outer position as shown in Figure 1 to its inner position as illustrated in Figure 2, orifice controlling surfaces 37, 36 and 35 are sequentially in control relation with orifice 26 and provide a first set-up flow condition, a "normal" response, a "reverse" response, and a second set-up flow condition in sequence.

In the graph of Figure 4 the vertical coordinate represents the position of float 41 along indicating tube 40 and the horizontal coordinate from left to right represents plunger position or movement from its outer to inward limits. With plunger 11 at its outer position determined by engagement of snap ring 20 with the inner end of bushing 22, surface 37 is in control relation with orifice 26 and a first set-up point is provided. At this flow condition float 41 should be at a predetermined position adjacent the upper end of tube 40.

As plunger 11 moves inward surface 37 continues in control relation to progressively decrease flow through a "normal" range of movement. Float 41 progressively drops in tube 40 and when surface 37 enters orifice 26 flow is effectively restricted until surface 36 appears at the upstream end of the orifice. At this point, surface 36 is in effective control of flow and the float rises through a "reverse" range with inward plunger movement during this portion of the movement range. As the space between surface 36 and orifice 26 becomes too great for effective flow control, the indicating float moves to the upper end of the tube beyond the effective gaging range. Then with further inward movement surface 35 comes in controlling relationship and progressively decreases flow until the plunger movement is terminating by the engagement of stop surface 24 with the outer end of bushing 22. At this point a second or lower set-up flow is provided at which indicating float 41 should be at a predetermined position adjacent the lower end of flow tube 40. Thus it is seen that two predetermined set-up or amplification check flow conditions are simply and economically provided and the head has both "normal" and "reverse" gaging ranges. Because the up and downstream portions of orifice 26 are symmetrical and the flow controlling surfaces are similar the amount of flow change per increment of increase flow movement will be the same as during decrease flow movement in the same direction for accurate gaging.

An exemplary application of the present gage head is illustrated diagrammatically in Figure 3. In this instance the diameter of a cylindrical piece 50 is measured irrespective of the eccentricity of cylindrical portion 50 relative to centers 52. Each of the gage heads is connected to an indicating tube 40 having a float 41 movable in accordance with the leakage through the gage head. In this example the upper gage head 10 is mounted so that it operates within its "normal" response range and the lower gage head is mounted so that it operates within its "reverse" range. The ranges are sufficient to accommodate the possible extent of variation in each instance.

Changes in diameter under these conditions will decrease flow through one gage head and increase flow through the other causing a difference in the relative positions of floats 41 to indicate the diameter variation. However, shifts of the center in either direction will affect the flow through both gage heads similarly, that is, opening flow equally through each or reducing flow equally through each. Thus floats 41 will rise or fall simultaneously with eccentricity but will relatively move in accordance with variations in diameter. This is intended merely as an illustration of the utilization of the "normal" and "reverse" response ranges of the gage head of this invention and other examples will be apparent to those skilled in the art.

While the controlling surfaces in Figures 1 and 2 have been shown as radial, in Figure 5 surfaces 36' and 37' of a conical or tapered configuration are provided to give a different amplification or, in effect, a different rate of flow change with plunger movement.

Thus it is seen that a gage head has been provided which is simple in construction and has advantages for ease in set-up and universal application. Through use of the two different flow conditions provided at the inner and outer limited positions of the controlling plunger set-up flows can be simply obtained without the necessity for expensive masters or complex manipulation. Amplification of the system can be quickly and simply checked to insure accurate and reliable gaging.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gage head for connection to an air leakage gaging system for measuring dimensions and the like, comprising a body having an orifice for communication at one side thereof with the atmosphere and adapted for communication at the other side with an air pressure source and a gaging device, whereby flow through the orifice is unidirectional, a plunger movable in said body relative to said orifice within a predetermined gaging movement range, said plunger having a work contactor at one end and orifice controlling surfaces relatively spaced along said plunger for progressively decreasing flow through said orifice during plunger movement in one direction opposite to the direction of air flow through the unit and through a portion of the gaging range and for progressively increasing flow during movement in the same direction through another portion of the gaging range.

2. A gage head for connection to an air leakage gaging system, comprising a body having an orifice for communication at one side thereof with the atmosphere and adapted for communication at the other side with an air pressure source and a gaging device, a plunger movable in said body relative to said orifice within a predetermined range, a first orifice controlling surface on said plunger for progressively decreasing flow through said orifice during plunger movement in one direction through a portion of the gaging movement range and with a predetermined flow change for each increment of plunger movement, and a second orifice controlling surface on said plunger for progressively increasing flow during movement in the same direction through another portion of the gaging movement range and with the same amount of flow change for each increment of plunger movement as during the decrease flow inward movement.

3. A gage head for connection to an air leakage gaging system for measuring dimensions and the like, comprising a body having an orifice therein for communication at one side thereof with the atmosphere and adapted for communication at the other side with an air pressure source and a gaging device whereby flow through the orifice is unidirectional, said orifice having up and downstream ends, a plunger movable in said body relative to said orifice within a predetermined range having substantially opposing orifice controlling surfaces axially spaced therealong and a work contactor at one end thereof, each of said surfaces being arranged for controlling association with the orifice during a different portion of the plunger gaging movement range, one with the upstream and the other with the downstream orifice end, whereby progressively increasing and progressively decreasing gaging flow conditions are obtained during plunger movement in the same direction counter to or in the direction of flow through the orifice and the increment of flow change for plunger movements is of a predetermined amount under both conditions.

4. A gage head of the character described for measuring dimensions and the like, comprising an elongated body having a passage therethrough and a plunger slidable coaxially in the body passage, said plunger having a work contactor projecting at one end beyond said body, an air inlet connection extending coaxially at the other end of said body for connection to an air pressure source and gaging device, said body passage and plunger having flow controlling surfaces for cooperation at different positions of said plunger within said body passage, and cooperating stop surfaces on said plunger and body so positioned relatively as to limit inward plunger movement and relatively position said surfaces to obtain one set-up flow condition and limit outward plunger movement and relatively position the surfaces to obtain another set-up flow condition.

5. A gage head for connection to an air leakage gaging system for measuring dimensions and the like comprising a body having orifice means adapted for connection to a source of air under pressure and a gaging device and exhausting to atmosphere, whereby flow through the orifice means is unidirectional, a plunger movable in the body relative to the orifice means having a work contactor at one end and spaced flow controlling surfaces therealong for cooperation with said orifice means within different portions of the plunger movement range, and cooperating stop surfaces on said plunger and body so positioned relatively as to limit inward plunger movement counter to the direction of flow through the orifice means and position one of said surfaces in flow controlling relation with said orifice means at one set-up flow condition and limit outward movement in the direction of flow with another of said surfaces in control relation with the orifice means at another set-up flow condition.

6. A gage head for connection to an air leakage gaging system, comprising a body having an orifice therein of limited axial extent for communication with a source of air under pressure and gaging means, the orifice exhausting to atmosphere, and a flow passage aligned with said orifice upstream thereof, a plunger slidably guided in said body in alignment with said orifice for movement relative thereto within a predetermined range, orifice controlling surfaces on said plunger relatively spaced along its length for sequential association with said orifice during plunger movement through its range in one direction, and guide means on said plunger slidably supported within said flow passage and including openings therethrough allowing air flow past said guide means.

7. A gage head of the character described comprising an elongated body having a passage therethrough and a plunger slidable coaxially in the body passage, said plunger having a work contactor projecting at one end beyond said body, an air inlet connection extending coaxially at the other end of said body for connection to an air pressure source and a gaging device, the body passage and plunger having cooperating axially spaced flow controlling portions, one of which portions progressively decreases air flow as the plunger moves inwardly relative to said body and another of which progressively increases flow as the plunger moves inwardly and at the same rate, a third of said portions providing a predetermined set-up flow condition, and cooperating stop surfaces on the plunger and body limiting the outward and inward extent of the plunger movement at points that respectively correspond to flows at predetermined set-up conditions.

8. A gage head for connection to an air leakage gaging system for measuring dimensions and the like, comprising an elongated body having an orifice therein for communication at one side thereof with the atmosphere and adapted for communication at the other side with a source of air under pressure and a gaging device, whereby flow through the orifice is unidirectional, the upstream and downstream orifice portions being relatively symmetrical, a plunger slidably guided in said body in alignment with said orifice means and having a work contactor at one end and a plurality of similar orifice controlling surfaces relatively spaced along its length, and limit means cooperating between said plunger and said body to determine the extent of plunger movement counter to or in the direction of flow through the orifice whereby the orifice controlling surfaces are placed sequentially in flow controlling relation with said orifice during plunger movement in one direction within said body and providing gaging ranges with both increasing and decreasing flows with inward plunger movement against the direction of flow.

9. A gage head as set forth in claim 8 in which said body has a passage axially spaced from said orifice and aligned therewith, said plunger having guide means adjacent its inner end slidable within said passage and having openings therein for passage of air past the guide means and through the orifice.

10. A gage head as set forth in claim 8 further comprising a sleeve supported within said body and providing said orifice and a guide passage aligned therewith and axially spaced from the orifice, the sleeve portion between the guide passage and orifice being radially enlarged, said plunger having guide means slidable within said sleeve passage and having openings therein providing for flow past the guide means and through the orifice to atmosphere.

11. A gage head as set forth in claim 8 wherein first, second, and third orifice controlling surfaces are spaced, in that sequence, along the plunger toward the inner end thereof, resilient means acting between said plunger and said body, and limit means cooperating between said plunger and body to determine the limits of plunger travel with the third orifice controlling surface in control relation with said orifice at the outermost plunger position and the first orifice controlling surface in control relationship therewith when the plunger is at its inner limited position.

12. A gage head for connection to an air leakage gaging system, comprising a body having an orifice therein of limited axial extent for communication at one side with the atmosphere and adapted for communication at the other side with a source of air under pressure and a gaging device, a plunger slidably guided within said body in alignment with said orifice for movement relative thereto within a predetermined range, said plunger having a flange like projection thereon providing a pair of opposed flow controlling surfaces whose transverse dimension is smaller than the corresponding dimension of said orifice, a shoulder on said plunger spaced from said flange-like projection providing a third flow controlling surface, said surfaces being sequentially in control relation with said orifice upon plunger movement within its movement range, and limit means cooperating between the plunger and body to determine an outer plunger position with one flow controlling surface in control relation with said orifice and an inner position with another of said surfaces in control relation with the orifice.

References Cited in the file of this patent

UNITED STATES PATENTS

| | | |
|---|---|---|
| 2,574,866 | Fahrlander | Nov. 13, 1951 |
| 2,691,827 | Aller | Oct. 19, 1954 |
| 2,746,424 | Segerstad et al. | May 22, 1956 |
| 2,776,673 | Goodman et al. | Jan. 8, 1957 |
| 2,831,257 | Aller | Apr. 22, 1958 |